(12) United States Patent
Luzon

(10) Patent No.: US 6,177,496 B1
(45) Date of Patent: Jan. 23, 2001

(54) PROCESS FOR MAKING ORGANIC MATERIALS RECEPTIVE TO COLORING AGENTS AND ADHESIVES

(76) Inventor: Charles F Luzon, 51 Haines Rd., Bedford Hills, NY (US) 10507

( * ) Notice: Under 35 U.S.C. 154(b), the term of this patent shall be extended for 0 days.

(21) Appl. No.: 09/339,025

(22) Filed: Jun. 23, 1999

Related U.S. Application Data

(63) Continuation-in-part of application No. 09/014,255, filed on Jan. 27, 1998, now abandoned.

(51) Int. Cl.[7] .............................. B05D 5/10; B05D 3/00; B05D 3/04; B05D 3/10; C08L 75/00
(52) U.S. Cl. ...................... 524/284; 427/207.1; 427/299; 427/302; 427/303; 427/322; 427/323; 427/324; 427/325; 427/326; 427/327; 427/331; 427/337; 427/340; 427/407.1; 427/407.2; 427/407.3; 427/408; 427/409; 427/411; 427/412; 427/412.1; 427/413; 427/414

(58) Field of Search .......................... 524/589; 427/207.1, 427/299, 302, 303, 322, 323, 324, 325, 326, 327, 331, 337, 340, 407.1, 407.2, 407.3, 408, 409, 411, 412, 412.1, 413, 414

(56) References Cited

U.S. PATENT DOCUMENTS

| | | |
|---|---|---|
| 3,940,385 | 2/1976 | Smith . |
| 3,979,343 | 9/1976 | Graham et al. . |
| 4,307,000 | 12/1981 | Vasta . |

OTHER PUBLICATIONS

U.S. application No. 09/014,255, Luzon, filed Jan. 27, 1998.

*Primary Examiner*—Nathan M. Nutter

(57) ABSTRACT

A process involving the application of an aromatic oil-modified polyurethane coating with a softening agent to specifically prepared solid synthetic organic and natural organic formed substrate materials wherein the coating has the capability of receiving subsequently-applied coloring agents and adhesives.

6 Claims, No Drawings

PROCESS FOR MAKING ORGANIC MATERIALS RECEPTIVE TO COLORING AGENTS AND ADHESIVES

CROSS-REFERENCE TO RELATED APPLICATIONS

Continuation-in-part of Luzon, application Ser. No. 09/014,255 filed Jan. 27, 1998 and now abandoned.

BACKGROUND OF THE INVENTION

1. Field of the Invention

The present application is a continuation-in-part of Luzon pending application Ser. No. 09/014,255 Jan. 27, 1998 and relates to coating formed solid synthetic organic and natural organic materials intended for later color and adhesive application, specifically, to aromatic oil-modified polyurethane coatings as applied to prepared solid synthetic organic, natural organic, and composite surfaces.

2. Description of the Related Art

Synthetic organic materials have been used extensively as molding treatments, as flooring, in marine applications, as insulating agents, and in other applications because the characteristics of these materials allow flexibility, durability to weather, cost advantages, and general performance advantages. Solid synthetic organic and natural organic materials are selected from the group consisting of formed materials which may include, in whole or in part, synthetic polymers, natural polymers, plastic, cellulose, rubber, silicon, stone, clay, wax, ceramics, starch, synthetic resins, natural resins, fibers, protein resins, and metals provided said materials when formed are sufficiently firm to receive a coating. Some of these materials have had the general disadvantage of being difficult or impossible to after-treat with coloring agents such as paint, wood stain, pigment, dye, etc. because of the chemical nature of the aforementioned synthetic organic material, as, for example, petroleum-based plastics. Prior to this invention, these materials have been produced either by using pigmented base material prior to substrate formation or by after-coloring using a variety of processes including heat-transfer printing, solvent ink imprinting, paper and vinyl overlays, or by sophisticated industrial processes not available to ordinary crafts-persons or laypersons. Plasters, polyester resins, and other materials have also been used with the general disadvantage of being too expensive for widespread use.

Coatings described in Smith U.S. Pat. No. 3,940,385 Feb. 24, 1976 all contain pigments and, though claim 2 refers to application on a composition containing an elastomer, this invention does not suggest use on inexpensive plastics, such as polyvinyl chloride (PVC). The patent assignee, The Sherwin-Williams Co., does not offer this invention nor any other product at the time of this application for uses similar to the present invention. Coatings described in Graham et al U.S. Pat. No. 3,979,343 Sep. 7, 1976 also include pigments in the coatings, do not refer to applications on plastics, and are not presented as bases for later-applied colorants. Vasta U.S. Pat. No. 4,307,000 Dec. 22, 1981 shows a coating used primarily in automotive applications on metal, but (a) does not suggest absorption of paints and stains, for example, which would visually simulate natural wood alternatives, (b) is not feasible for use by ordinary persons in non-professional environments, and (c) is not offered for sale by E.I. DuPont Nemours and Company, the patent assignee, for uses related to the present invention.

Accordingly, the object of the present invention is to allow solid synthetic organic and natural organic material, which has been chemically and/or mechanically prepared and has been treated with an aromatic oil-modified polyurethane coating as described in this invention, to accept commonly available paints, stains, inks, dyes, other coloring agents, and adhesives which may be applied by professionals or laypersons for extended periods of time (more than 12 months) subsequent to the coating application. Furthermore, this invention allows the use of less expensive substrate materials, for example, PVC, where previously more expensive substrates were used. It also allows, when the coating contains pigments or dyes, a one-step coloring process for some materials, PVC as an example, previously thought to be resistant to paints and stains.

BRIEF SUMMARY OF THE INVENTION

A process wherein an aromatic oil-modified polyurethane coating is applied to synthetic organic and natural organic solid surfaces which have been either mechanically or chemically abraded if necessary, wherein the coating is a liquid comprised by weight but not limited to approximately 18–41% aromatic oil-modified polyurethane resins, approximately 55–78% aliphatic hydrocarbons, under 1% metal catalysts as drying agents, approximately 1% anti-skinning agents, and approximately 2% N-methyl-2-pyrrolidone as softening agent to promote mechanical adhesion, to which coating pigments and dyes may or may not be added.

DETAILED DESCRIPTION OF THE INVENTION

The process of this invention is the application of an aromatic oil-modified polyurethane coating which has been enhanced by anti-skinning agents and softeners to a solid synthetic organic or natural organic substrate which has been prepared either by means of chemical or material additives to the substrate or by chemical or mechanical abrasion applied to the surface of the substrate intended for coating, or both. The aforementioned substrate, for example, but not limited to, PVC, Polypropylene, and other plastics, may be formed using any of the methods commonly employed, including extrusion, RF molding, transfer molding, injection molding, compression molding, and other methods.

Substrate Preparation:

There are at least two (2) basic types of substrate preparation,

I. Additives: Chemical and material additives can be mixed with synthetic organic material prior to forming the substrate, for the purpose of increasing the potential for adhesion of the coating described in a later section. There are potentially a great number of such additives; two examples are given:

(A) a solvent-soluble acrylic resin with self-crosslinking properties in crystal form with a density of 8.6 lbs/gal and a specific gravity of (water=1) 1.20, which in this example is compatible with PVC when intended for extrusion, is added to the material bath prior to extrusion in such a volume as has been determined optimal for a given end-use. As an additive, this resin promotes mechanical adhesion that the PVC itself cannot provide due to its molecular nature; this resin also has a tendency to inhibit the migration of plasticizers to the surface of formed plastics, which is a primary factor contributing to the minimal porosity or non-porosity of PVC and other plastic compounds. The inventor believes that some oxidation also occurs, which contributes to the lack of porosity.

(B) a blowing agent, azocol, as one example, is added to PVC prior to forming, which forces the molecules apart, thereby encouraging better mechanical adhesion of the coating described in a later section. Blowing agents may be used in conjunction with substrate additives as described in (A) above.

II. Abrasion: Applied to the surface of the formed substrate, abrasion may be accomplished by chemical or mechanical means; for some substrates normal exposure to weather over a period of time will abrade them, but this method is not recommended for the purposes of this invention. Abrasion is necessary to defeat the "skin" resulting from the aforementioned migration of plasticizers and, perhaps, oxidation in the forming process. Abrasion is performed specifically to increase the potential for mechanical adhesion of the coating described in a later section. These examples are given, though other methods might be used:

(A) Abrasive papers, such as 120 Grade Sandpaper, can be applied to flexible and rigid PVC of durometers 60–90 (Shore A, points) by hand, wheel, sander, or other means. Types of abrasive means in this method would be designed according to the formulation, durometer, dimensions, etc. of the substrate, and also by the conditions under which the abrasion is to be performed. Those conditions might include industrial settings, construction jobsites, or residential situations.

(B) Chemical abrasion may be achieved by treating the surface of the substrate with, for example, but not limited to, butanol or butyl alcohols ($C_4H_9OH$) subsequent to substrate formation, prior to the coating application. Chemical abrasion is preferred for those instances where the substrate surface is not a nearly uniform plane.

Alternatives to the chemical abrasives include any chemical substance with the ability to defeat the aforementioned "skin" on the surface of the substrate. Alternatives to the mechanical abrasion method described above might include wire brushing, metal wools, particle bombardment of the surface, tool designs which would impart microscopic "pores" into the substrate surface, matte surface finishes, plastics formulations such as cellular plastics, and other methods designed to defeat the inherent lack of porosity characteristic of many plastics. Significant attention was given in this invention to the areas of substrate additives and surface abrasion techniques in order to make this invention compatible with the least costly and most universally applicable synthetic organic materials, thereby greatly increasing the usefulness of this invention. This invention has been applied to materials as thin as 0.005" (PVC) and 0.003" (Polypropylene), though these should not be considered limits, and, because it is a surface treatment, this process should be considered to have an unlimited maximum substrate thickness application. Due to the variety of potential surface preparation methods, the inventor believes this invention would be applicable to solid synthetic and natural organic material of any durometer.

Coating Application:

The function of the coating is two-fold: (1) in conjunction with aforementioned substrate preparation processes, the coating is formulated with an anti-skinning agent and a softening agent, N-methyl-2-pyrrolidone, to defeat the aforementioned "skin" of the formed substrate and thereby to allow mechanical adhesion to occur between the substrate and the coating described in this section. Depending on the chemical composition of the substrate, chemical bonding may also occur. The inventor believes this to be the first time N-methyl-2-pyrrolidone has been used for the purpose described in this invention, namely, to assist in weakening the aforementioned "skin" of plastics and to aid in softening plastic substrates. The effect of this mechanical bonding is to make the coating described in this section a permanent part of the substrate; (2) the coating, when dry, provides a receptive resinous layer which has the capacity to receive and fix coloring agents such as paints, stains, inks, pigments, dyes, etc., and adhesives for a period of at least twelve (12) months after the coating application. The inventor has not been able to determine an extreme limit, in terms of time, in which colorants and adhesives may effectively be applied to this invention. This aspect of extended time for color and adhesive application is an important improvement over previous methods described in a prior section. The formulations given here for the coatings may be applied at any time after the substrate has been formed, provided the appropriate substrate preparation has been made; the application of this coating does not require a commercial setting nor special equipment for application. Normal methods of application would include dipping, rolling, brushing, spraying, and others.

Because the process of this invention provides a porous surface to some substrates, for example, plastics, previously considered minimally or non-porous, another important result of this invention is that adhesives of lower cost and less physical hazard may be used to affix substrates prepared with this invention; for example, common cellulose-based adhesives may be used in some cases where previously a more chemically sophisticated adhesive, such as a polyurethane glue, was required. Because of the porosity imparted to the substrates through the use of this process, lower cost inks with less toxicity may be used for colorants.

An important aspect of this invention is that the formulations for the coatings, in particular the resin content, were developed so that the drying time and the absorption rate for ordinary paints and stains were similar to natural wood when painted or stained with the same colorant, and that the colorants commonly used on natural wood would dry to approximately the same tone and color when applied to materials treated with the process of this invention. This allows this invention to be used on materials used not only in place of natural wood, natural organic, and synthetic organic materials but in conjunction with those materials as well. The coating formulations described in this section will not have a deleterious effect on natural wood or most other common building materials. This invention is also useful because its employment, whether by professional or layperson, requires no special tools, procedures, safety equipment, or techniques which would be unfamiliar to him.

EXAMPLE

A PVC substrate is desired for use in a decorative molding application alongside natural oak panelling to be stained. Said substrate is extruded to a desired profile, including in the surface, imparted by molding tool or finishing tool, three-dimensional ruts, grooves, indentations, etc. to simulate natural grain patterns of oak. Having been prepared by one or more of the procedures described in the Substrate Preparation section, the substrate is then coated with the coating described in this section. The coating, when applied to the surface of the substrate, will tend to fill the crevices and uniformly coat the flat surfaces to an even depth. Because the coating described in this invention is the absorbing agent for the colorant, not the PVC itself, the wood stain, in this case, will tend to absorb more densely in the crevices, where the coating is deepest.

The end result visually is a darker shade in the crevices than on the flatter surfaces, which is visually consistent with natural wood when stained. When a wood stain is applied to both the oak panelling and the decorative molding made of PVC, the result will be a consistent color for both materials with a visible wood-grain appearance. Alternatively, if the natural oak had been previously stained, colorant may be added to the coating prior to application to the PVC molding so the panelling and molding will show a similar color and tone when installed adjacent to one another. Other desired visual effects, such as an appearance of natural stone, would be achieved using the same methods.

Another useful aspect of this invention is that, when colored, because the coloring agent is absorbed by the coating only and not by the substrate, it colors more uniformly than natural materials, it doesn't require a primer, it requires less coloring agent than, for example, wood, because the coloring agent is not absorbed as deeply into the wood, and, because the coated synthetic material is less subject to weathering over time as compared with wood, the colorant will also degrade less. Pigments and dyes are compatible with and may be included in the coating formulations given in this invention when it is desirable that the coating and coloring functions be performed as a single procedure.

The coating is an aromatic oil-modified polyurethane, in solution volume consisting of approximately 18–41% aromatic oil-modified polyurethane resins, 55–78% aliphatic hydrocarbons, under 1% metal catalysts as drying agents, 1% anti-skinning agents, and 2% N-methyl-2-pyrrolidone as softening agent to promote mechanical adhesion to solid synthetic organic and natural organic materials. The coating formulation given here has a specific gravity of approximately 0.9076 ($H_2O=1$), a boiling point of 312°–385° F., a vapor pressure (mm Hg) of approximately 3.9 PSIA@163° F., and a vapor density of approximately 5.00, with a clear appearance and a negligible water solubility.

One formulation of the above components, which, when applied by the methods suggested previously to a formed substrate which has been prepared by one or more of the methods described in the Substrate Preparation section, will provide a desirable surface for the application of colorants and adhesives, is given here. This formulation, given as a broadly applicable version, is compatible with PVC when the substrate has been formed by any of the manufacturing procedures previously suggested. It may be applied by any of the means previously suggested and dries at room temperature (72° F.), requiring anywhere from a few minutes to several hours for drying, depending on type of substrate, durometer, atmospheric humidity, surface preparation, and other factors. It dries to a nearly clear finish so as not to compete with later-applied colorants. This is an improvement over previous primer-type coatings which are not clear.

Formulation, in solution volume by weight:

| | |
|---|---|
| Solvent aliphatic hydrocarbons | (71.20%) |
| Catalytic agents | |
| Calcium naphthenate | (00.10%) |
| Cobalt octoate | (00.05%) |
| Zirconium octoate | (00.40%) |
| Toluene diisocyanate (TDI) | |
| Modified soya oil | (25.50%) |
| Methyl ethyl ketoxime | (00.75%) |
| N-methyl-2-pyrrolidone (NMP) | (02.00%) |

Because this invention is intended for use on several solid synthetic organic and natural organic substrates, the formulae should be designed accordingly. Some formulation adjustments are given to address some desired end-results; this list should not be considered a complete list of adaptations:

a decrease in the percentage of resins, replacing that quantity with solvents, will achieve slightly better color integrity when the end result desired is a simulation of so-called "blond" woods;

linseed oil polymers, among others, may substitute for modified soya oil for some cost savings;

the driers can be adjusted by small percentages (under 1%) or substituted for when faster drying is required, as is preferred in manufacturing situations;

the anti-skinning agents should be adjusted relative to their effectiveness on particular substrate materials based on composition, durometer, and other factors;

hydro-treated light petroleum distillates, among others, may serve as solvents;

a consideration of the content of resins and driers should be made when pigment or dye is added to the formulation;

an increase in the percentage volume of resins is recommended when the end-product is intended to simulate stone, ceramics, metals, and other materials where the color application is a significant part of the visual simulation, intended to look like some material other than plastic. The formulation given in this section has been specifically formulated for use on plastic substrates intended for use as replacements for wood products.

This invention can be used on a variety of solid synthetic organic and natural organic substrates and is compatible with a broad range of commonly available paints, stains, adhesives, and coloring agents. It is also cost-competitive as compared with familiar building materials, such as natural wood, when used for a similar purpose, and, in many applications, provides a more durable material requiring less maintenance which is not limited in terms of color application, a significant advantage over some previously available synthetic materials. Furthermore, many products employing this invention could conceivably be re-used, unlike, for example, most wood products. Depending on substrate formulation, some products employing this invention can be fully re-cycled, and this invention can be used on many re-cycled materials.

I claim:

1. A process for preparing solid synthetic organic and natural organic materials to accept coloring agents subsequent to the forming of those materials comprising the steps of:

(1) adding chemical or material substances to synthetic organic and natural organic material prior to forming and/or chemical or mechanical surface abrasion subsequent to forming, (2) applying an aromatic oil-modified polyurethane coating to the surface of the formed material comprised of, in solution volume by weight, approximately 18–41% aromatic oil-modified polyurethane resins, approximately 55–78% aliphatic hydrocarbons, under 1% metal catalysts, approximately 1% anti-skinning agents, and approximately 2% N-methyl-2-pyrrolidone.

2. The process of claim 1 as applied to solid synthetic organic and natural organic material for the purpose of accepting adhesives.

3. The process of claim 1 as applied to solid synthetic organic and natural organic material for the purpose of accepting printed inks.

4. The process of claim 1 wherein said coating contains pigment or other colorant in suspension.

5. The process of claim 1 wherein said coating contains dye or other colorant in solution.

6. The process of claim 1 wherein said coating includes butanols or mixtures thereof in conjunction with or in place of N-methyl-2-pyrrolidone.

\* \* \* \* \*